United States Patent Office 3,424,192
Patented Jan. 28, 1969

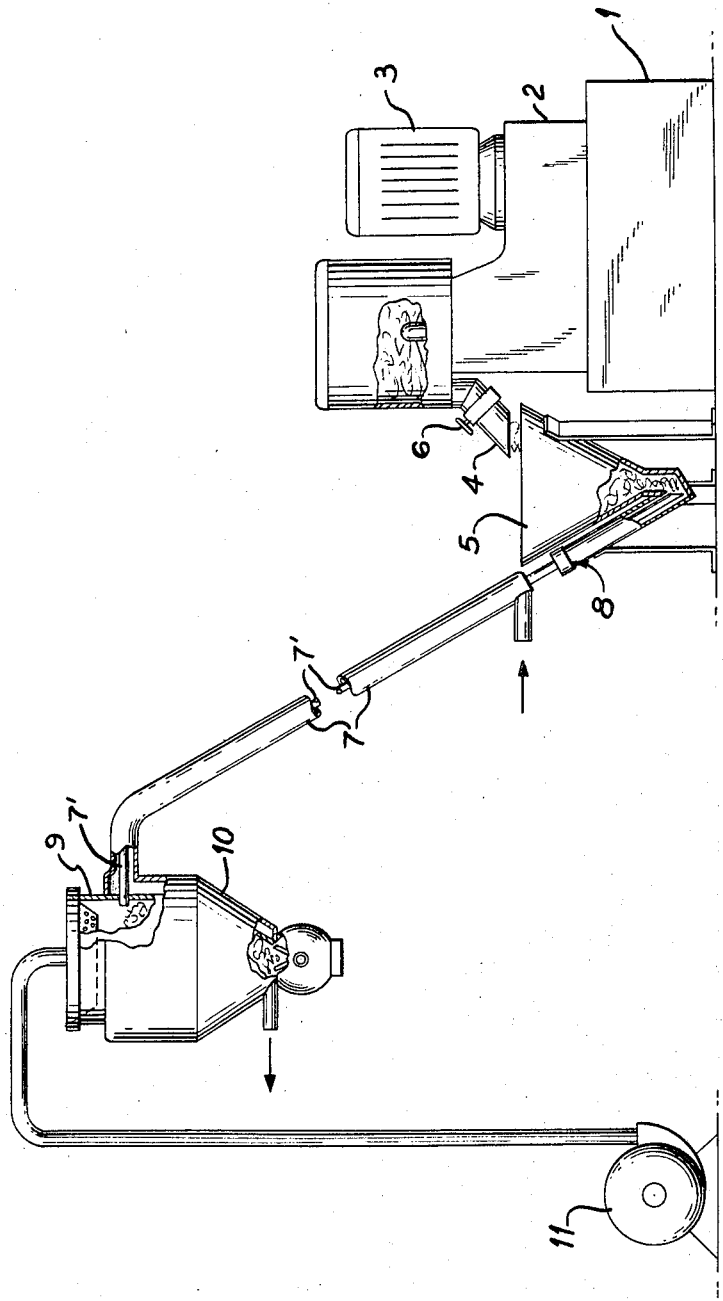

3,424,192
EQUIPMENT, MORE PARTICULARLY FOR MANUFACTURING PLASTIC MATERIALS
Paul Rayneri, 20 Rue Franklin, Montreuil Sous Bois, Seine-St-Denis, France
Filed May 13, 1965, Ser. No. 455,501
Claims priority, application France, Oct. 26, 1964, 992,705
U.S. Cl. 137—340                  1 Claim
Int. Cl. B01j *13/00;* B01f *3/22*

ABSTRACT OF THE DISCLOSURE

Equipment for making plastic materials comprising means for cooling a heated mixture during its travel from a hopper receiving the heated mixture from the mixer to a cyclone hopper and including co-axial piping. Pneumatic means are provided for propelling the mixture and fluid means for cooling the mixture all in the co-axial mixture.

---

The main object of the invention is the manufacture of plastic materials, from plastic powders, and liquid or powdered plasticizers, this assembly requiring to be pre-jellified.

Another object of the invention is to mix and heat the powder and plasticizer assembly, in a mixer, to obtain the prejellification.

Another object of the invention is to eliminate a slow movement mixer intended to cool the prejellified mixture.

Another object of the invention is to cool the mixture in a time not exceeding that required for bringing it to the requisite temperature for prejellification.

Other objects and advantages will be revealed by the description and claims, as well as the attached drawing, which gives a diagrammatical idea of the main components of the invention.

Known equipment intended to obtain plastic mixtures from a plasitc powder mixed with liquid or powdered plasticizers generally comprises a mixture in which plastic powder, liquid or powdered plasticizers are placed, of charges for being mixed with this powder for prejellification.

The plastic powder and plasticizers were mixed and heated in the mixer during a given time which generally reach 15 minutes, so that the mixture occurred as a prejellification at 80° C. or more.

To be able to store or distribute the mixture to molding operations or the like, it was necessary to cool said mixture without loss of time down to about 40° C.

To accomplish this, this said equipment generally comprised a second mixer with a slow movement, into which the prejellified mixture was poured, said mixture being kneaded during about 30 minutes until it had time to cool down to the requisite temperature, after which, it was conveyed to the required posts.

The chief drawback of this known equipment lay in the appreciable loss of time caused by cooling the pre-jellified mixture, this cooling being necessary to prevent the solidifying of the product.

Also, this equipment required two mixers to be used, which led to an expensive layout.

On the one hand, to solve the problem raised by the loss of time due to known equipment, and on the other, to reduce costly investments, the equipment shown in the attached figure consists of a mixer, connected by a hopper to a cyclone hopper, by means of a double casing tubing, which enables the mixture to be conveyed while cooling it, or only to cool it by making it circulate pneumatically.

To do this, the equipment comprises, as in that known, a support 1, on which the mixer 2 rests, the latter being actuated by a source of energy which, can, for example, be a motor 3.

The plastic powder is placed in the mixer 2, on the one hand, and on the other, the plasticizers which can be liquid or powdered.

This mixer mixes the plastic powder and plasticizer, for example, up to a point when the mixture is heated to a temperature of at least 80° C. or more.

The channel 4 ensures a permanent link between the mixer and the receiving hopper 5.

To this end it should be noticed that the piping can be provided with a closing component such as a valve 6 or the like.

The receiving hopper 5 is connected to the cyclone hopper 9 by a piping which has the peculiarity of being made of a double casing, i.e., of two coaxial tubes 7 and 7′.

This double piping is not directly connected to the lower base of the receiving hopper 5, owing to the presence of air intakes 8, ensuring the passage of an air current through the coaxial tube 7 so that the mixture is pneumatically conveyed.

These air intakes can be of any number and can have ventilation components or the like added to them. Between the tubes 7 and 7′ a fluid circulation passes, such as cold water which can ensure the cooling of the coaxial tube 7′ so as to cool by repercussion the mixture poured from the mixer 2 into the hopper 5 and channeled into the tube 7′.

The mixture pneumatically conveyed into the tube 7′ reaches the cyclone hopper.

It can then be directly poured into storage places, or placed in the cyclone hopper, as shown at 9 on the attached figure.

In this case, the cyclone hopper 9 will be provided with a double casing 10 in which a water circulation will also pass, so that the material contained in the cyclone hopper can continue to cool.

The upper part of the cyclone hopper also comprises a suction component 11 which creates a depression, so as to ensure the sucking in of the mixture coming from the hopper 5.

The fundamental objects of the present invention essentially lie on the overpressure of the slow movement cooling mixer so as to reduce investments in equipment, and on the possibility of conveying the mixture while cooling it.

On the other hand, the mixture, spreading out in the connecting piping 7, is drawn out and ventilated, which ensures its cooling in a very short time.

We can thus cool a quantity of mixture in a time not exceeding the duration of the rise to the required pre-jellification temperature.

On this account, the output of the mixer is identical with the output of cooling, which enables the equipment to be continuously operated without letting up.

It should be noted that the piping 7 and 7′ must be made of material such as steel or the like, and able to be moved around, so as to pour out the mixture in a required spot.

On the other hand, all the components forming this equipment can be so grouped as to form a compact and homogeneous unit.

It is quite obvious that this cooling process is not restricted to the obtaining of plastic materials, and that it can be adapted without going outside of the scope of the invention, to any heated product that must be cooled in the shortest possible time.

What I claim is:

1. Equipment for making plastic material comprising mixer means for ensuring the prejellification of a mixture of plastic powder and plasticizer means, hopper means communicating with said mixer means for receiving a heated prejellified mixture from said mixture means, a cyclone hopper for receiving a cooled prejellified mixture from said hopper means, and a tubular member connecting said hopper means with said cyclone hopper for conveying said prejellifiied mixture, suction means connected to said cyclone hopper for drawing material from said hopper means through said tubular member into said cyclone hopper, said tubular member further having air inlet means for pneumatically circulating said heated mixture through said tubular member, said tubular member further having a fluid cooling means coaxial therewith and surrounding said heated pneumatically circulated mixture for cooling said heated pneumatically circulated mixture.

References Cited

UNITED STATES PATENTS

| | | | |
|---|---|---|---|
| 2,174,056 | 9/1939 | Dokkum | 23—260 |
| 2,361,283 | 10/1944 | Good | 23—260 |
| 2,457,962 | 1/1949 | Whaley | 23—260 X |
| 2,779,357 | 1/1957 | Stonestreet et al. | 141—82 |
| 2,901,339 | 8/1959 | Boomer et al. | 23—260 X |
| 3,045,007 | 7/1962 | Mitchell et al. | 23—260 X |
| 3,070,621 | 12/1962 | Lind | 23—260 X |
| 3,180,880 | 4/1965 | Harrison et al. | 23—260 X |
| 3,201,095 | 8/1965 | Erwien et al. | 259—108 |
| 3,233,969 | 2/1966 | Heller et al. | 23—260 |
| 3,279,893 | 10/1966 | Sikorski | 259—108 X |

FOREIGN PATENTS

| | | |
|---|---|---|
| 897,444 | 5/1962 | Great Britain. |
| 1,105,334 | 4/1961 | Germany. |

SAMUEL SCOTT, *Primary Examiner.*